(12) United States Patent
Hu et al.

(10) Patent No.: US 12,069,776 B2
(45) Date of Patent: Aug. 20, 2024

(54) HEATING UNIT

(71) Applicant: WUHU Aldoc Technology Co., Ltd., Anhui (CN)

(72) Inventors: Ruguo Hu, Anhui (CN); Yanbin Tang, Anhui (CN); Yijie Lu, Anhui (CN)

(73) Assignee: WUHU Aldoc Technology Co., Ltd. (CN)

( * ) Notice: Subject to any disclaimer, the term of this patent is extended or adjusted under 35 U.S.C. 154(b) by 279 days.

(21) Appl. No.: 15/570,899

(22) PCT Filed: Dec. 30, 2016

(86) PCT No.: PCT/CN2016/113543
§ 371 (c)(1),
(2) Date: Oct. 31, 2017

(87) PCT Pub. No.: WO2018/120036
PCT Pub. Date: Jul. 5, 2018

(65) Prior Publication Data
US 2019/0053331 A1    Feb. 14, 2019

(30) Foreign Application Priority Data
Dec. 27, 2016   (CN) .......................... 201611226034.8

(51) Int. Cl.
*H05B 1/02*     (2006.01)
*B01D 17/04*    (2006.01)
(Continued)

(52) U.S. Cl.
CPC ......... *H05B 1/0297* (2013.01); *B01D 17/042* (2013.01); *B01D 17/06* (2013.01);
(Continued)

(58) Field of Classification Search
CPC .............................. H05B 1/0297; H05B 3/42; F24H 9/02; F24H 9/0015; B01D 17/042
(Continued)

(56) References Cited

U.S. PATENT DOCUMENTS

| 985,619 | A | * | 2/1911 | Miller | ....................... F24H 9/02 |
| | | | | | 126/114 |
| 1,094,309 | A | * | 4/1914 | Daw | ........................ F24H 9/02 |
| | | | | | 126/114 |

(Continued)

FOREIGN PATENT DOCUMENTS

| CN | 204087111 U | * | 1/2015 | |
| CN | 105424745 A | * | 3/2016 | |
| JP | 2017095099 A | * | 6/2017 | ............. F28F 13/12 |

*Primary Examiner* — Steven B McAllister
*Assistant Examiner* — Daniel E. Namay (57) ABSTRACT

A heating component comprising a housing, at least one heating component and at least one connecting member; the heating component is disposed within the housing, and the connecting member is disposed on at least one side of the outer wall of the housing; the connecting member is assembled to the housing; the connecting member comprises a slot and a slot wall; the slot wall is located on the periphery of the slot; at least a part of the slot wall is outwardly recessed; the heating component comprises at least one chamber, and the chamber comprises a space formed between the slot wall and the outer wall of the housing; the connecting member comprises a first connecting port and a second connecting port; the first connecting port is connected to the chamber, and the second connecting port is also connected to the chamber; the first connecting port is connected to the second connecting port through the chamber.

12 Claims, 9 Drawing Sheets

(51) Int. Cl.
*B01D 17/06* (2006.01)
*F24H 1/00* (2022.01)
*F24H 1/10* (2022.01)
*F24H 1/12* (2022.01)
*F24H 9/02* (2006.01)
*H05B 3/42* (2006.01)

(52) U.S. Cl.
CPC ........... *F24H 1/0018* (2013.01); *F24H 1/101* (2013.01); *F24H 1/121* (2013.01); *F24H 1/122* (2013.01); *F24H 9/02* (2013.01); *H05B 3/42* (2013.01)

(58) Field of Classification Search
USPC ........................................ 237/1 SL; 219/628
See application file for complete search history.

(56) References Cited

U.S. PATENT DOCUMENTS

| | | | | |
|---|---|---|---|---|
| 1,854,322 A * | 4/1932 | White | ..................... | F24H 1/202 219/628 |
| 3,556,298 A * | 1/1971 | Werner | ................ | B01D 29/016 210/131 |
| 5,212,763 A * | 5/1993 | Arold | .................... | F24H 9/2071 219/502 |
| 5,965,048 A * | 10/1999 | Powers | ..................... | F23C 5/00 219/385 |
| 6,926,206 B2 * | 8/2005 | Schlecht | ............. | B60H 1/2212 165/41 |
| 7,171,926 B2 * | 2/2007 | Ito | ............................ | F01P 7/16 123/195 R |
| 7,308,870 B2 * | 12/2007 | Hada | ...................... | F01P 11/028 123/41.25 |
| 9,528,722 B1 * | 12/2016 | Hansen | ..................... | F24H 9/02 |
| 9,895,957 B2 * | 2/2018 | Eckert | ................. | B60H 1/2225 |
| 2003/0173413 A1 * | 9/2003 | Schlecht | ............. | B60H 1/2212 237/12.3 C |
| 2005/0135796 A1 * | 6/2005 | Carr | ...................... | E21B 36/005 392/478 |
| 2005/0260530 A1 * | 11/2005 | Schlecht | ............. | B60H 1/2203 431/261 |
| 2008/0128525 A1 * | 6/2008 | Ludwig | ................... | B60H 1/2212 237/12.3 A |
| 2011/0174160 A1 * | 7/2011 | Blanc | .................... | A47J 31/542 99/288 |
| 2013/0302737 A1 * | 11/2013 | Schultz | ................... | F24H 3/087 431/6 |
| 2015/0090802 A1 * | 4/2015 | Eckert | ................. | B60H 1/2221 237/12 |
| 2015/0202555 A1 * | 7/2015 | Kometter | ............... | B01D 35/26 156/345.18 |
| 2015/0345826 A1 * | 12/2015 | Lutz | ...................... | F24H 1/102 392/490 |
| 2016/0025378 A1 * | 1/2016 | Aguilar | ..................... | F24H 9/06 122/19.2 |
| 2016/0216045 A1 * | 7/2016 | Chan | ........................ | F28F 13/12 |
| 2017/0217751 A1 * | 8/2017 | Jarisch | ................... | A47J 31/542 |
| 2018/0199628 A1 * | 7/2018 | Sheng | ..................... | B05B 7/1686 |

\* cited by examiner

Figure 9 ns of traditional electrical
HEATING UNIT

TECHNICAL FIELD OF THE INVENTION

The present invention relates to the technical field of electrical heating, and more particularly, to an electrical heating unit.

BACKGROUND OF THE INVENTION

A traditional electrical heater usually comprises a heating component and a metal housing. During the heating process, a significant amount of heat generated by the electrical heater is transmitted to the metal housing, resulting in a high temperature of the outer surface of the housing. In extreme cases, the overheated metal housing can be harmful for the external structure or the connecting structure. Even worse, the functional life of the electrical heater can be seriously shortened due to the excessively-high temperature.

In conclusion, the shortcomings of traditional electrical heaters are urgent problems that need to be solved for those skilled in this field.

SUMMARY OF THE INVENTION

The purpose of the present invention is to solve the shortcomings in the prior art and provide a heating component having a simple structure and a housing structure that does not overheat during operation.

To achieve the above purpose, the present invention adopts the following technical solution:

A heating unit comprising a housing, at least one heating component and at least one connecting member; the heating component is disposed within the housing, and the connecting member is disposed on at least one side of the outer wall of the housing; the connecting member is assembled to the housing; the connecting member comprises a slot and a slot wall; the slot wall is located on the periphery of the slot; at least a part of the slot wall is outwardly recessed; the heating component comprises at least one chamber, and the chamber comprises a space formed between the slot wall and the outer wall of the housing; the connecting member comprises a first connecting port and a second connecting port; the first connecting port is connected to the chamber, and the second connecting port is also connected to the chamber; the first connecting port is connected to the second connecting port through the chamber.

Compared with the prior art, the present invention has the following advantages:

The outer wall of the housing is provided with a connecting member, and a chamber used for liquid to flow therein is disposed between the connecting member and the housing. Consequently, the fluid in the chamber can flow to disperse the heat, thereby decreasing the temperature of the housing without affecting internal fluid flow in the heating component. Furthermore, the connecting member is assembled to the housing, enabling the connecting member to be easily replaced. Thus, the functional life of the heating component can be greatly prolonged.

BRIEF DESCRIPTION OF THE DRAWINGS

To clearly expound the present invention or technical solution, the drawings and embodiments are hereinafter combined to illustrate the present invention. Obviously, the drawings are merely some embodiments of the present invention and those skilled in the art can associate themselves with other drawings without paying creative labor.

DETAILED DESCRIPTION OF THE INVENTION

Drawings and detailed embodiments are combined hereinafter to elaborate the technical principles of the present invention.

Figure 1:
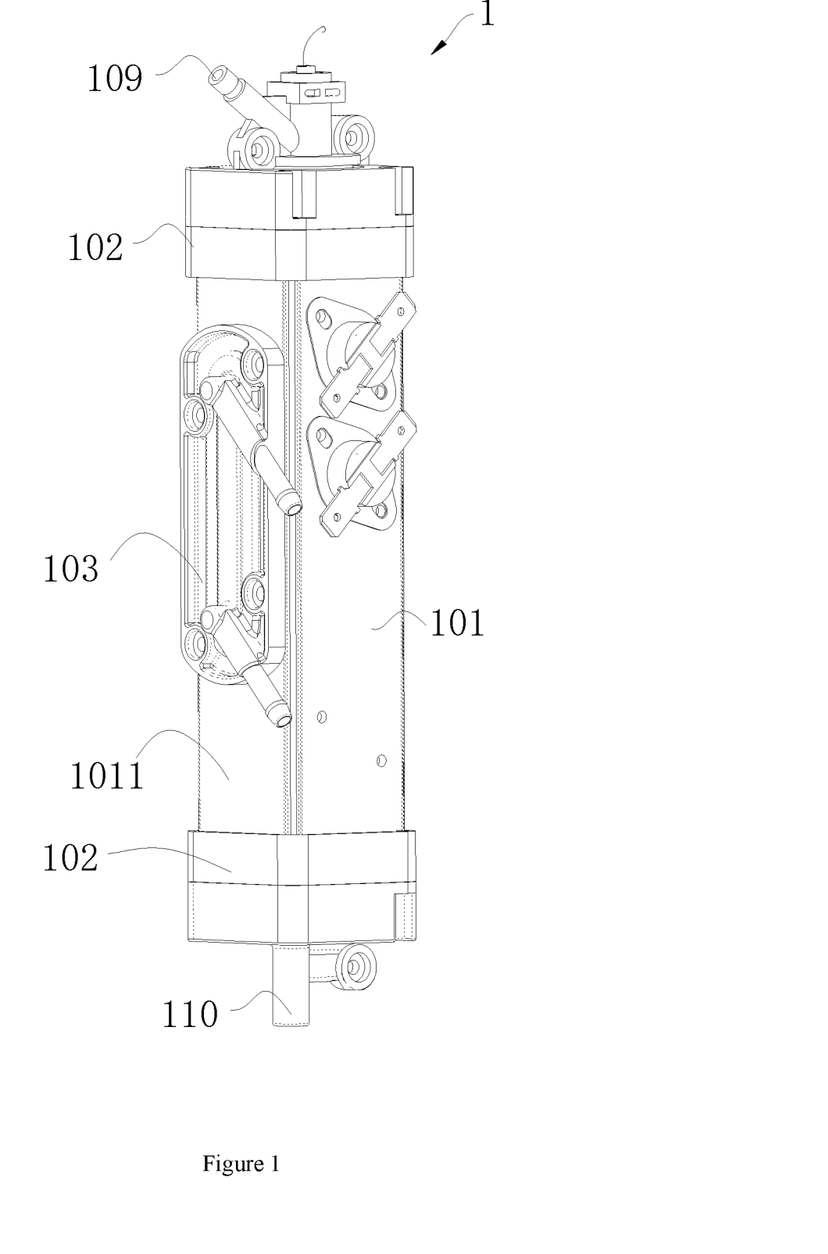
FIG. 1 is a three-dimensional assembly view of an embodiment of the heating unit shown in FIG. 1.

FIG. 1 shows a three-dimensional structure of an embodiment of the heating unit 1 of the present invention. The heating unit 1 comprises a housing 101, an end cap 102, a connecting member 103 and a heating component (not shown in FIG. 1). The heating component is disposed within the housing 101, and the connecting member 103 is disposed on the outer wall of the housing 101. As shown in FIG. 1, the housing 101 has four side walls, and the connecting member 103 is placed on at least one outer side wall 1011. The connecting member 103 is assembled to the housing 101. The end cap 102, which is placed at the end portion of the housing 101, is assembled to the housing 101 to seal the end portion of the housing 101. In this embodiment, the two ends of the housing 101 are both provided with end caps. In some other embodiments, the housing 101 can also be a structure having one end sealed by an end cap. In such a way, the end cap is disposed at only one end of the housing 101. The heating component can be either a heating sheet or a heating pipe (e.g., a film heating sheet or a film heating pipe). The quantity of the heating component is not limited, which can be simply determined by the requirement of heating power or by both the heating power and the size of the heating component. Specifically, the quantity of the heating component can be one or more than one, such as one, two, three or five, etc. Additionally, when the housing is a multi-sided body, the outer wall is located on at least one side of the housing; and when the housing is a cylindrical body, the outer wall is located on at least a part of the arc surface of the housing.

Figure 2:
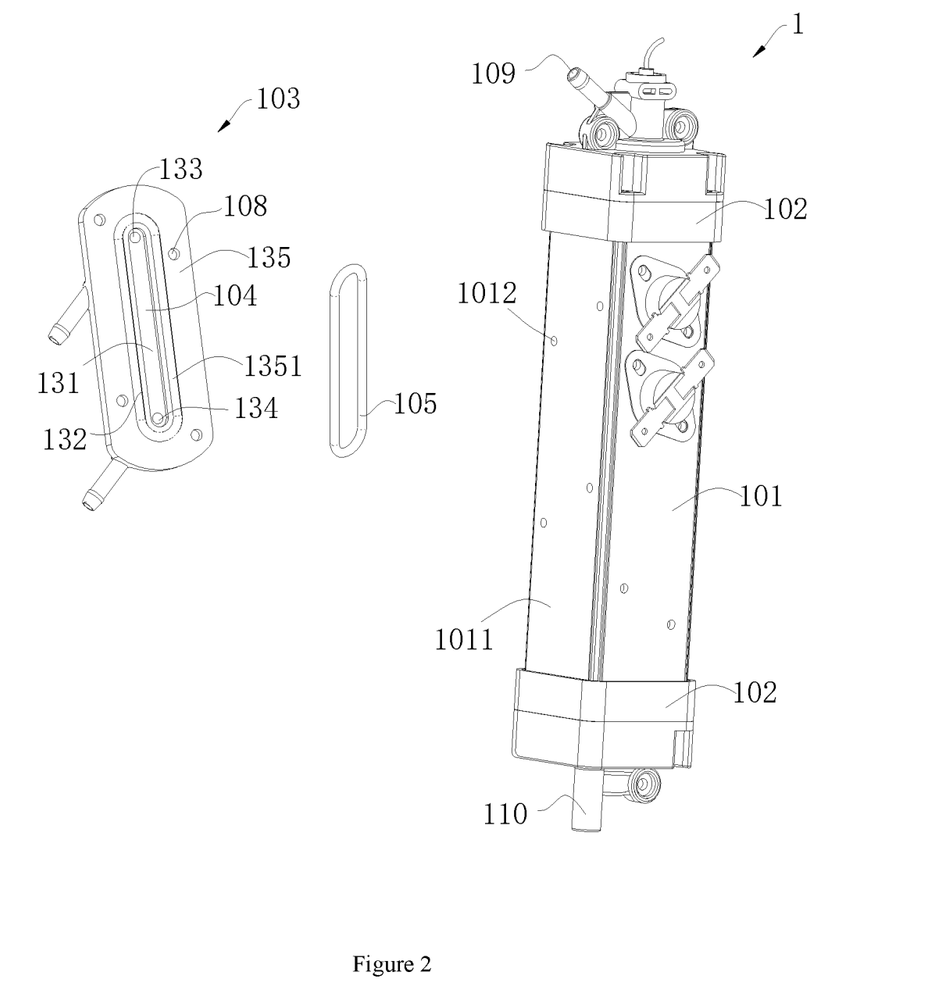
FIG. 2 is an explosive view of a part of the heating unit shown in FIG. 1.

FIG. 2 shows a three-dimensional exploded structure of the heating unit 1. The connecting member 103 comprises a slot 131 and a slot wall 132. The opening of the slot 131 faces the outer wall 1011 of the housing 101, and the slot wall 132 is located at the periphery of the slot 131. The heating unit 1 comprises at least one chamber 104, which comprises a space formed between the slot wall 132 and the outer wall 1011 of the housing 101. The connecting member 103 comprises a first connecting port 133 and a second connecting port 134. The first connecting port 133 is connected to the chamber 104, and the second connecting port 134 is connected to the chamber 104 as well. The first connecting port 133 and the second connecting port 134 are respectively connected to the two ends of the chamber 104. The first connecting port 133 is connected to the second connecting port 134 through the chamber 104.

When the heating unit is working, the fluid is allowed to flow within the connecting member. Consequently, the low-temperature fluid enters into the chamber 104 from the first connecting port 133, and becomes in contact with the outer wall 1011 of the housing 101, thereby taking away a part of the heat on the housing. Subsequently, the low temperature fluid flows out from the second connecting port 134, thereby decreasing the temperature of the housing. Thus, the external structure of the heating component or the connecting structure of the housing can be effectively protected from being affected by the excessively-high temperature of the housing, greatly prolonging the functional life the heating component.

Figure 3:
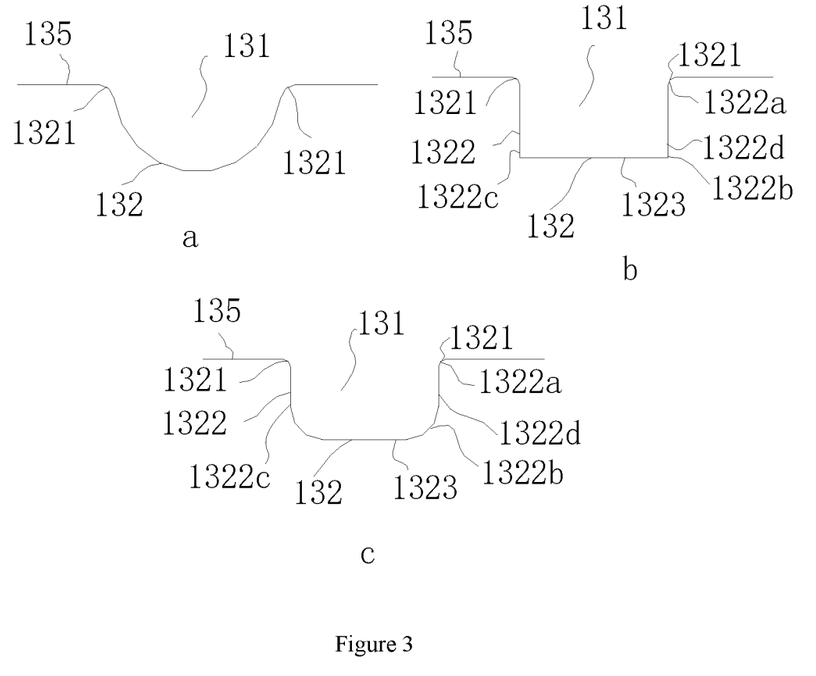
FIG. 3 is a sectional view of the connecting member illustrating the cross-sectional structure of the slot.

As shown in FIG. 3, a, b and c are schematic diagrams showing the various structures of the cross-section of the slot 131. The connecting member 103 comprises a fixing wall 135. The slot wall 132 comprises an end portion 1321, and the end portion 1321 forms the opening of the slot. At least a part of the fixing wall 135 is integrally connected to the end portion 1321 of the slot wall 132, and at least a part of the fixing wall 135 oppositely abuts against the outer wall 1011 of the housing 101. The fixing wall 135, which is assembled to the outer wall 1011, is sealed to the outer wall 1011, thereby forming the chamber 104. For instance, the fixing wall 135 and the outer wall 1011 can be sealed by sealant or sealing elements. The first connecting port 133 and the second connecting port 134, which are disposed on the slot wall 132, extend throughout the slot wall 132. The fixing wall can either directly abut against at least one outer side wall 1011 or indirectly abut against at least one outer side wall 1011 through a medium.

To further ensure the sealing performance between the connecting member 103 and the outer wall of the housing, as shown in FIG. 2, the heating unit 1 comprises a sealing component 105, which is disposed between the fixing wall 135 and the outer wall 1011. Alternatively, a recess portion corresponding to the sealing component 105 (e.g., a locating slot) can be disposed on the fixing wall 135 or the outer wall 1011. The sealing component 105 is disposed in the recess portion. The fixing wall 135 and the outer wall 1011 are sealed by the sealing component 105. Specifically, the sealing component 105 can be a sealing ring, a sealing sleeve, or other irregular configurations.

In the embodiment shown in FIGS. 2-3, the sealing component 105 is a sealing ring, and the fixing wall 135 is provided with at least one locating slot 1351. The locating slot 1351 is disposed around the end portion 1321 of the slot wall 132, and the sealing component 105 is limited in the locating slot 1351. In another embodiment, the outer wall 1011 is provided with at least one locating slot along the direction perpendicular to the surface of the outer wall 1011. The locating slot is disposed on the outer wall 1011 by the end portion of the slot wall 132, and the sealing component is disposed in the locating slot. In some other embodiments, the fixing wall or at least one outer side wall of the housing is provided with at least two locating slots, thereby ensuring a higher sealing performance between the connecting member and the outer wall of the housing. In some embodiments, both the fixing wall and at least one outer side wall of the housing are provided with a locating slot and a sealing component. For instance, a U-shaped sealing sleeve can be disposed in the locating slot to seal the fluid existed between the connecting member and the outer wall of the housing.

As shown in FIG. 3a, at least a part of the slot wall 132 is outwardly recessed to form an arc shape, and the end portion 1321 of the slot wall 132 forms the opening of the slot 131.

As shown in FIGS. 3b and 3c, the slot wall 132 comprises a side wall 1322 and a bottom wall 1323. The end portion 1321 of the slot wall 132 is located on the side wall 1322. The bottom wall 1323 is disposed to correspond to the outer wall 1011. The side wall 1322 comprises a first end portion 1322a and a second end portion 1322b, which are outwardly disposed along the radial direction of the center of the heating component. The second end portion 1322b is disposed at the exterior of the first end portion 1322a. The first end portion 1322a of the side wall 1322 oppositely abuts against the outer wall 1011, and the second end portion 1322b is integrally connected to the bottom wall 1323. The chamber 104 comprises a space formed by the side wall 1322, the bottom wall 1323 and the outer wall of the housing 101.

Figure 4:
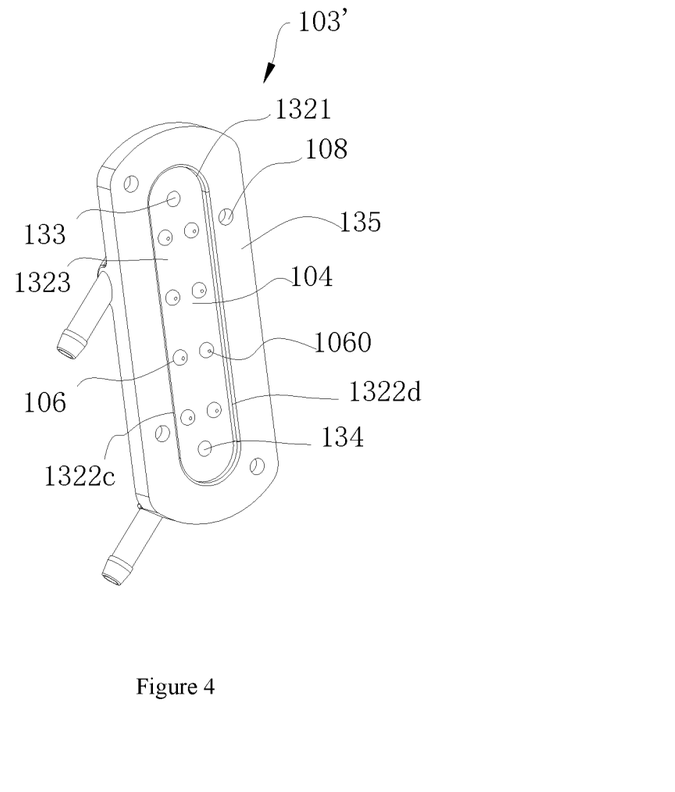
FIG. 4 is a three-dimensional structure diagram of an embodiment of the connecting member.
Figure 5:
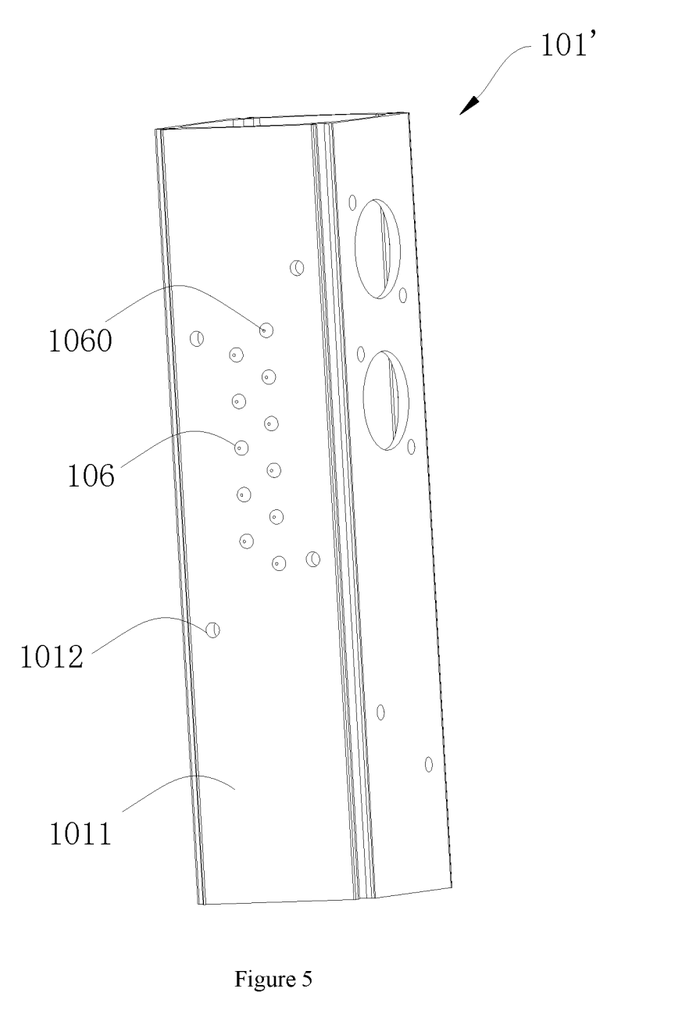
FIG. 5 is a three-dimensional structure diagram of an embodiment of the housing.
Figure 6:
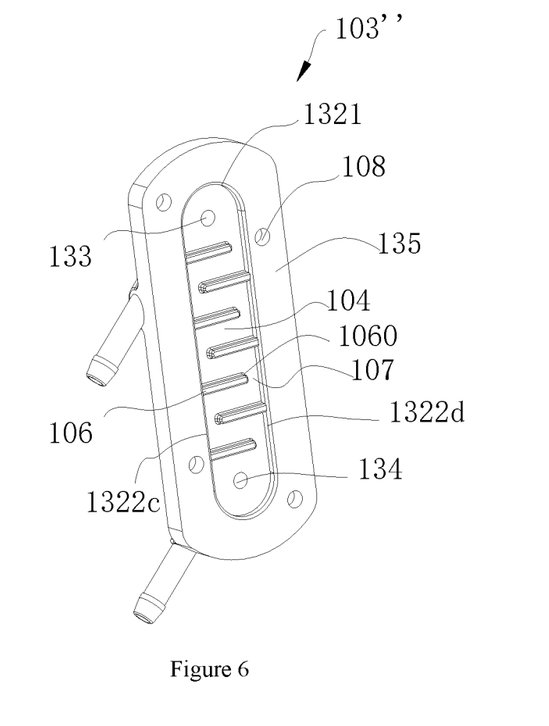
FIG. 6 is a three-dimensional structure diagram of another embodiment of the connecting member.

In order to make the fluid remain in the chamber longer so that more heat can be absorbed, as shown in FIGS. 4-6, the heating unit 1 comprises a fluid-separating portion 106, which is disposed in the chamber 104. The fluid-separating portion 106 is disposed in an area between the position corresponding to the first connecting port 133 in the chamber 104 and that corresponding to the second connecting port 134 in the chamber 104. The quantity of the fluid-separating portion 106 can be one or more. A plurality of fluid-separating portions can be arranged at intervals. The fluid-separating portion 106, which protrudes outwardly, is disposed on at least one of the slot wall 132 and the outer wall 1011 of the housing 101.

Specifically, the fluid-separating portion is a protruding structure, which protrudes from at least one of the slot wall and the outer wall. For instance, the fluid-separating portion protrudes from at least one of the side wall and the bottom wall. Alternatively, the fluid-separating portion, which is disposed on the outer wall of the housing, protrudes from the outer wall of the housing. More specifically, in the embodiment shown in FIG. 4 (a three-dimensional structure diagram of the connecting member 103'), the fluid-separating portion is a protruding structure. The bottom wall 1323 of the connecting portion 103' is provided with a plurality of fluid-separating portions. The plurality of fluid-separating portions, which is distributed between the position corresponding to the first connecting port 133 in the chamber and that corresponding to the second connecting port 134 in the chamber, is disposed along the radial direction of the heating component. The fluid-separating portions inwardly protrude, namely, facing the direction of the outer wall 1011. In such a way, the fluid path between the first connecting port 133 and the second connecting port 134 is split into a plurality of fluid paths, effectively lengthening the flow distance. Consequently, the heat on the surface of the housing can be easily taken away. The height of the fluid-separating portion is equal to or slightly less than the distance between the bottom wall 1323 and the outer wall 1011, thereby lengthening the flow path of the fluid and enhancing the turbulence and heat absorption of the fluid. In another embodiment of the present invention, the side wall 1322 can be provided with a plurality of fluid-separating portions, which are arranged in a staggered manner. The height of the plurality of fluid-separating portions distributed along the radial direction of the heating component is equal to or slightly less than the distance between the bottom wall 1323 and the outer wall 1011.

In the embodiment shown in FIG. 5 (a three-dimensional structure diagram of the housing 101'), the fluid-separating portion 106 is disposed on the outer wall 1011 of the housing 101', and protrudes from the side wall 1101 of the housing. The fluid-separating portion protrudes outwardly, and the end portion 1060 of the fluid-separating portion 106 oppositely abuts against the bottom wall 1323 of the connecting member. In this embodiment, "inwardly" means facing the center of the heating component, and "outwardly" means dispersing outwardly from the center of the heating component.

Specifically, the fluid-separating portion 106 can be a strip structure. The fluid-separating portion 106 is disposed in an area between the position corresponding to the first connecting port 133 in the chamber 104 and that corresponding to the second connecting port 134 in the chamber 104. At least one side of the fluid-separating portion is integrally disposed with at least a part of the slot wall. For instance, the fluid-separating portion is integrally disposed with at least one of the side wall and the bottom wall. At least another side of the fluid-separating portion is not in contact with at least a part of the slot wall. The heating unit comprises a connecting section 107, which is disposed between at least another side of the fluid-separating portion and the slot wall.

More specifically, in the embodiment shown in FIG. 6 (a three-dimensional structure diagram of the connecting member 103"), the fluid-separating portion 106 is a strip structure. The side wall 1322 is provided with a first side portion 1322c and a second side portion 1322d, which are disposed to correspond to each other. The fluid-separating portion 106 extends from the first side portion 1322c to the second side portion 1322d, and is not in contact with the second side portion 1322d. The connecting section 107 is disposed between the end portion 1060 of the fluid-separating portion 106 and the second side portion 1322d, and/or the fluid-separating portion 106 extending from the second side portion 1322d to the first side portion 1322c is not in contact with the first side portion 1322c. The connecting section 107 is disposed between the end portion 1060 of the fluid-separating portion 106 and the first side portion 1322c. The fluid meanders from the first connecting port to the second connecting port for staying longer in the chamber. Consequently, the heat transfer efficiency can be greatly improved, and the temperature of the housing surface can be significantly decreased.

In another embodiment of the present invention, the fluid-separating portion can be disposed on the slot wall. The fluid-separating portion is a strip structure capable of separating the chamber into two or more portions. One end of the fluid-separating portion is fixed to the slot wall, and the other end of the fluid-separating portion is not in contact with the slot wall. The heating unit further comprises a connecting section, which is disposed between the other end of the fluid-separating portion and the slot wall. At this moment, the first connecting port and the second connecting port are simultaneously disposed at one side portion of the connecting member. Alternatively, the first connecting port and the second connecting port can be disposed at different side portions of the connecting member. Additionally, the fluid-separating portion can be both a protruding structure and a strip structure.

The connecting member is made from plastic or metal. The connecting members 103, 103' and 103", which are fixed to the housing 101 through assembling, are sealed to the housing 101. Thus, the heating unit cannot be affected even if the connecting members 103, 103' and 103" are damaged during the working process, realizing a safe and reliable operation. For instance, as shown in FIGS. 2, 4 and 6, the connecting members 103, 103' and 103" are provided with at least two locating holes 108. The locating hole 108 extends throughout the connecting member 103, and is disposed around the periphery of the end portion 1321 of the slot wall 132. The outer wall 1011 of the housing is provided with a mounting hole 1012, which is approximately coaxially disposed with the locating hole 108. The position of the mounting hole 1012 is disposed to correspond to that of the mounting hole 108. The connecting member further comprises a fixing member, which is inserted into the locating hole and the mounting hole. The connecting member is assembled to the housing through the fixing member. The fixing member can be a bolt, a screw, a rivet, etc. In some other embodiments, the heating unit can further comprise a locating plate and a fixing member. The locating plate comprises at least two side portions protruding from the exterior of the connecting member. The at least two side portions protruding from the exterior of the connecting member are provided locating holes. The mounting hole is approximately coaxially disposed with the locating hole, and the fixing member is inserted into the locating hole and the mounting hole. The connecting member is assembled to the housing through the fixing member. The fixing member can be a bolt, a screw, a rivet, etc.

Figure 7:
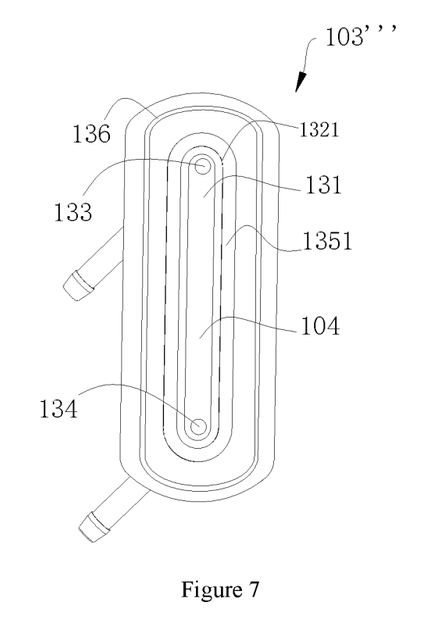
FIG. 7 is a three-dimensional structure diagram of another embodiment of the connecting member.
Figure 8:
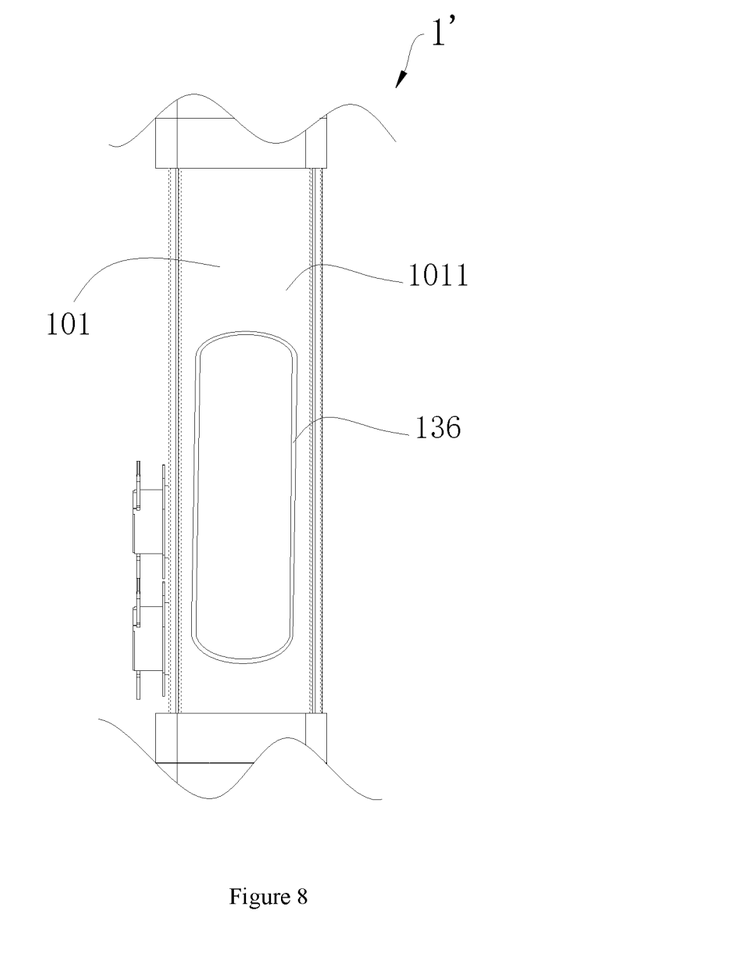
FIG. 8 is a three-dimensional side partial view of an embodiment of the heating unit, in which the connecting member is not shown.

Obviously, the fixing means between the connecting member and the housing is not limited to the above embodiments. In an embodiment shown in FIG. 7 (a structural diagram of the connecting member 103'''), the connecting member 103''' comprises a limiting protruding portion 136, which surrounds the end portion 1321 of the slot wall 132. The outer wall 1011 of the housing 101 is provided with a limiting recess portion, which is engaged with the limiting protruding portion. In another embodiment shown in FIG. 8 (a plan schematic diagram of a part of the heating unit 1), the outer wall 1011 of the housing 101 is provided with a limiting protruding portion 136 along the direction perpendicular to the surface of the outer wall. The limiting protruding portion 136 is disposed on the outer wall 1011 by the end portion 1321 of the slot wall 132. The connecting member comprises a limiting recess portion, which is engaged with the limiting protruding portion. Through the engagement between the limiting protruding portion and the limiting recess portion, the connecting member and the outer wall of the housing can be precisely assembled, greatly improving the sealing performance between the connecting member and the outer wall of the housing.

The position of the first connecting port 133 and the second connecting port 134 can be determined by the practical situation. The first connecting port 133 and the second connecting port 134 can be simultaneously disposed on the bottom wall 1323 (as shown in FIG. 2), or one of them is disposed on the bottom wall 1323. Alternatively, the first connecting port 133 and the second connecting port 134 are simultaneously disposed on the side wall 1322, or one of them is disposed on the side wall 1322.

Furthermore, as shown in FIGS. 1 and 2, the heating unit 1 further comprises a first connecting mouth 109 and a second connecting mouth 110. The heating component comprises a fluid heating channel. The first connecting mouth 109 is connected to the fluid heating channel, and the second connecting mouth 110 is also connected to the fluid heating channel. The fluid enters into the heating unit 1 from the first connecting mouth 109. When passing the fluid heating channel, the fluid is heated under the action of the heating component (e.g., heat radiation or heat transmission), and subsequently flows out from the second connecting mouth 110.

In one embodiment of the present invention, the second connecting port 134 is connected to the first connecting mouth 109, allowing the fluid passing through the chamber 104 to enter into the first connecting mouth 109 from the second connecting port 134. The fluid in the chamber can obtain the heat transferred or radiated to the housing of the heating unit by the heating component, thereby decreasing the temperature of the housing of the heating unit, and making the external temperature of the heating unit to be comparatively low. Meanwhile, the fluid in the chamber can be pre-heated, realizing a second heating of the fluid. Thus, the heating efficiency of the heating unit can be significantly enhanced. The heating unit 1 comprises a fluid channel, which is composed of the first connecting port 133, the chamber 104, the second connecting port 134, the first connecting mouth 109, the fluid heating channel and the second connecting mouth 110.

The second connecting port 134 can be connected to the first connecting mouth 109 through a connecting pipe, or through the internal structure of the heating component. Specifically, in one embodiment of the present invention, the heating unit 1 comprises a connecting pipe or a connecting block. The second connecting port 134 is connected to the first connecting mouth 109 through a connecting pipe. Alternatively, the connecting block is provided with a connecting channel. The second connecting port is connected to one end of the connecting channel, and the first connecting mouth is connected to the other end of the connecting channel. In another embodiment, the end cap 102 is provided with a connecting channel. The second connecting port is connected to one end of the connecting channel, and the first connecting port is connected to the other end of the connecting channel.

In some other embodiments, the heating unit further comprises a pre-heating fluid path, which is disposed within the housing. One end of the pre-heating fluid path is connected to the second connecting port, and the other end of the pre-heating fluid path is connected to the first connecting port. The heating unit comprises a fluid channel, which is composed of the first connecting port, the chamber, the second connecting port, the pre-heating fluid path, the first connecting mouth, the fluid heating channel and the second connecting mouth. Consequently, after being heated for three times, the heating speed of the fluid can be greatly increased, which can satisfy the instant-heating requirement in some situations.

In some embodiments, the second connecting port 134 is not connected to the first connecting mouth. In such a configuration, the heating unit can be provided with a fluid flowing path across the chamber and another fluid flowing path across the heating component. The quantity of the connecting member can be determined according to the practical requirement. The connecting member 103 can be disposed on two or more side walls of the housing, and the length of the connecting member 103 along the vertical direction of the housing can be roughly equal to or slightly less than the length of the housing, thereby enabling the fluid in the connecting member to effectively decrease the temperature of the housing.

Figure 9:
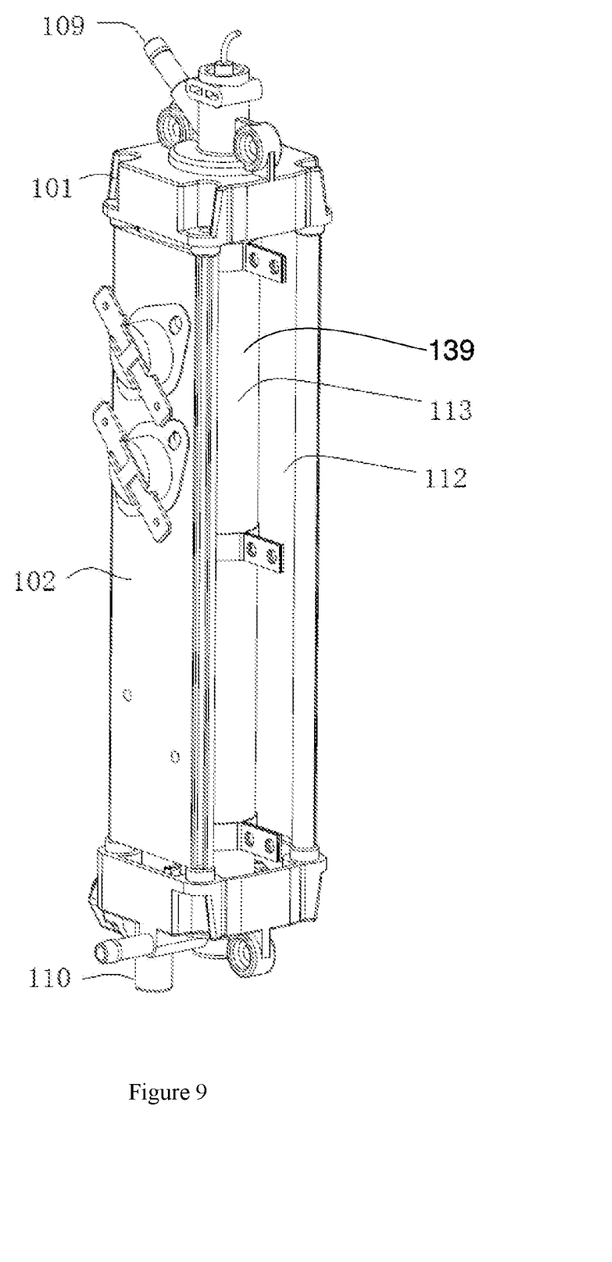
FIG. 9 is a three-dimensional side partial view of an embodiment of dissipating heat generated by the heating unit through the groove on the housing, in which the connecting member is not shown.

FIG. 9 shows another embodiment of the present invention. The housing 101 is provided with at least one groove 112, which is helpful for dissipating the heat generated during the working of the heating pipe 113 out from the heating system. This design is very practical for a simplified heating system.

The above heating unit can be widely applied to various fields, such as industrial heating, vehicle fluid heating and home appliances (e.g., coffee maker, water dispenser, soybean milk machine, water heater, etc).

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A heating unit of an electrical heater, comprising:
a housing,
at least one heating component,
at least one connecting member,
at least one chamber,
a first connecting mouth,
a second connecting mouth,
a first fluid channel, and
a second fluid channel,
wherein the heating component is disposed within the housing, and the connecting member is disposed on an outer surface of an outer wall of the housing, wherein the connecting member is assembled to the housing, wherein the connecting member comprises a slot and a slot wall, wherein the connecting member is configured to receive a fluid, wherein the slot wall is located on the periphery of the slot, wherein at least a part of the slot wall is outwardly recessed, wherein the chamber is a space formed between the slot wall of the connecting member and the outer surface of the outer wall of the housing, wherein the connecting member comprises a first connecting port and a second connecting port, wherein the first connecting port is connected to the chamber, and the second connecting port is also connected to the chamber, wherein the first connecting port is connected to the second connecting port through the chamber, the first fluid channel further comprising the first connecting port, the chamber, the second connecting port, wherein the second heating channel further comprising the first connecting mouth, and the second connecting mouth.

2. The heating unit of claim 1, wherein the housing is a multi-sided body, and the outer wall is located on at least one side of the housing, or wherein the housing is a cylindrical body, the outer wall is located on at least a part of the arc surface of the housing, wherein the connecting member comprises a fixing wall, wherein the slot wall comprises an end portion, and the end portion forms the opening of the slot, wherein at least a part of the fixing wall is integrally connected to the end portion of the slot wall, and at least a part of the opposing fixing wall abuts against the outer wall of the housing, wherein the fixing wall, which is assembled to the outer wall, is sealed to the outer wall, wherein the first connecting port and the second connecting port, which are disposed on the slot wall, extend throughout the slot wall.

3. The heating unit of claim 1, wherein the heating component comprises a fluid-separating portion, which is disposed in the chamber, wherein the fluid-separating portion is disposed in an area between the position corresponding to the first connecting port in the chamber and that corresponding to the second connecting port in the chamber, wherein the fluid-separating portion is a protruding structure, which protrudes from at least one of the slot wall and the outer wall, and/or wherein the fluid-separating portion is a strip structure, wherein at least one side of the fluid-separating portion is integrally disposed with at least a part of the slot wall, wherein at least another side of the fluid-separating portion is not in contact with at least a part of the slot wall, wherein the heating component comprises a connecting section, which is disposed between at least another side of the fluid-separating portion and the slot wall.

4. The heating unit of claim 3, wherein the fluid-separating portion is a protruding structure, wherein the fluid-separating portion is disposed on the bottom wall along the radial direction of the heating component, wherein the fluid-separating portion protrudes towards the side of the outer wall, wherein the protruding height of the fluid-separating portion is equal to or slightly less than the distance between the bottom wall and the outer wall of the housing, or wherein the fluid-separating portions are disposed on the side wall in a staggered manner, wherein the height of the fluid-separating portion along the radial direction of the heating component is equal to or slightly less than the distance between the bottom wall and the outer wall of the housing, or wherein the fluid-separating portion is disposed on the outer wall of the housing, and the end portion of the fluid-separating portion oppositely abuts against the bottom wall, or wherein the fluid-separating portion is a strip structure, wherein the side wall is provided with a first side portion and a second side portion, which are disposed to correspond to each other, wherein the fluid-separating portion extends from the first side portion to the second side portion, and is not in contact with the second side portion, wherein the connecting section is disposed between the end portion of the fluid-separating portion and the second side portion, and/or wherein the fluid-separating portion extending from the second side portion to the first side portion is not in contact with the first side portion, wherein the connecting section is disposed between the end portion of the fluid-separating portion and the first side portion.

5. The heating unit of claim 1, wherein the slot wall comprises at least a side wall and a bottom wall, wherein the end portion of the slot wall is disposed on the side wall, wherein the bottom wall is disposed to correspond to the outer wall, wherein the side wall comprises a first end portion and a second end portion, which are outwardly disposed along the radial direction of the center of the heating component, wherein the second end portion is disposed at the exterior of the first end portion, wherein the first end portion of the opposing side wall abuts against the outer wall, and the second end portion is integrally connected to the bottom wall, wherein the chamber comprises a space formed by the side wall, the bottom wall and the outer wall of the housing, wherein the first connecting port is disposed on the side wall or the bottom wall, wherein the second connecting port is disposed on the side wall or the bottom wall, wherein at least a part of the slot wall outwardly recesses to form an arc shape, wherein the end portion of the slot wall forms the opening of the slot.

6. The heating unit of claim 5, wherein the wall slot comprises an end portion, which forms the opening of the slot, wherein the connecting member comprises a limiting protruding portion, which surrounds the end portion of the slot wall, wherein the outer wall of the housing is provided with a limiting recess portion, which is engaged with the limiting protruding portion, or wherein the outer wall of the housing is provided with a limiting protruding portion along the direction perpendicular to the surface of the outer wall, wherein the connecting member comprises a limiting recess portion, which is engaged with the limiting protruding portion.

7. The heating unit of claim 6, wherein the slot wall comprises an end portion, which forms the opening of the slot, wherein the connecting member comprises a fixing member and at least two locating holes, wherein the locating hole extends through the connecting member, and is disposed around the periphery of the end portion of the slot wall, wherein the outer wall of the housing is provided with a mounting hole, which is approximately coaxially disposed with the locating hole, wherein the position of the mounting hole is disposed to correspond to that of the mounting hole, wherein the fixing member is inserted into the locating hole and the mounting hole, wherein the connecting member is assembled to the housing through the fixing member, or wherein the heating component comprises a locating plate and a fixing member, wherein the locating plate comprises at least two side portions protruding out from the connecting member, which are respectively provided with locating holes, wherein the fixing member is inserted into the locating hole, and the connecting member is assembled to the housing through the fixing member.

8. The heating unit of claim 1, wherein the heating component comprises a sealing component, which is disposed between the fixing wall and the outer wall of the housing, wherein the fixing wall and the outer wall of the housing are sealed through the sealing component, wherein the fixing wall is provided with at least one locating slot, wherein the locating slot is disposed around the end portion of the slot wall, and the sealing component is disposed in the locating slot, and/or wherein the outer wall of the housing is provided with at least one locating slot along the direction perpendicular to the surface of the outer wall.

9. The heating unit of claim 1, wherein the heating component comprises a connecting pipe, through which the second connecting port is connected to the first connecting mouth, or wherein the heating component comprises a connecting block, which is provided with a connecting channel, wherein the second connecting port is connected to one end of the connecting channel, and the first connecting mouth is connected to the other end of the connecting channel, or wherein the heating component comprises an end cap, which is disposed at the end portion of the housing and is assembled to the housing, wherein the end cap is provided with a connecting channel, wherein the second connecting port is connected to one end of the connecting channel, and the first connecting mouth is connected to the other end of the connecting channel.

10. The heating unit of claim 9, wherein the heating component further comprises a pre-heating fluid path, which is disposed within the housing, wherein one end of the pre-heating fluid path is connected to the second connecting port, and the other end of the pre-heating fluid path is connected to the first connecting port.

11. The heating unit of claim 1, wherein the housing of the heating component is provided with a groove for dissipating heat.

12. The heating component of claim 1, comprising at least two connecting members.

* * * * *